Feb. 13, 1951     C. J. RUNDQUIST     2,541,386
LOADING AND UNLOADING MECHANISM
FOR BAKING OVEN CONVEYERS
Filed Dec. 17, 1945     7 Sheets-Sheet 5
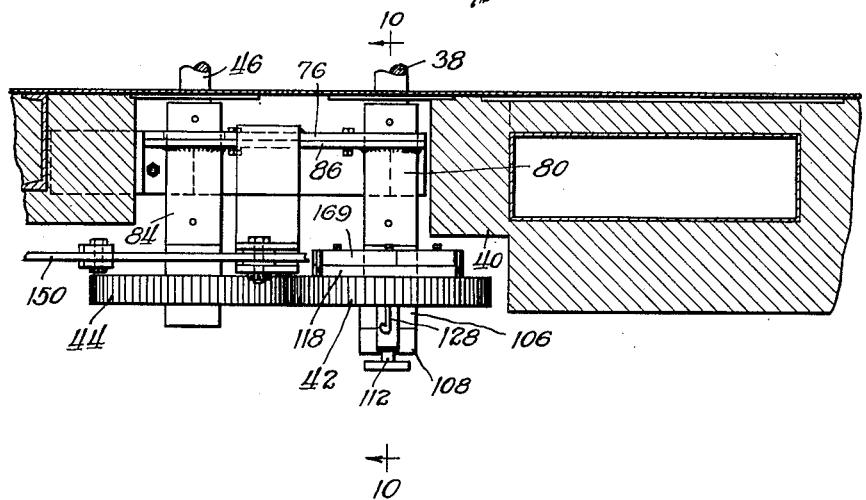
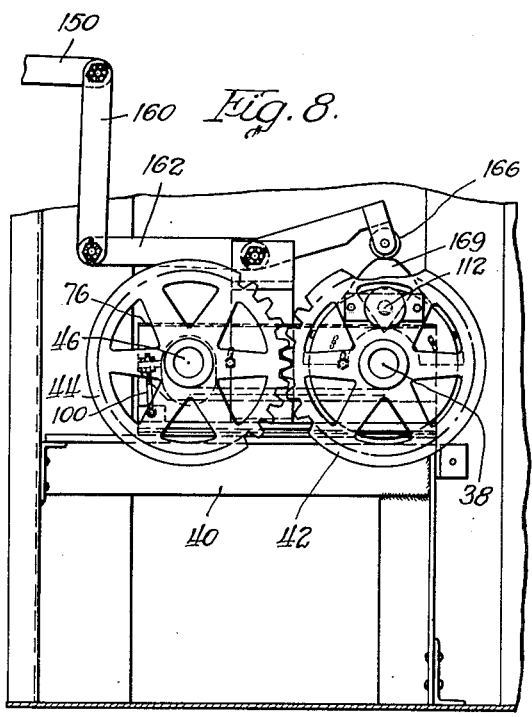
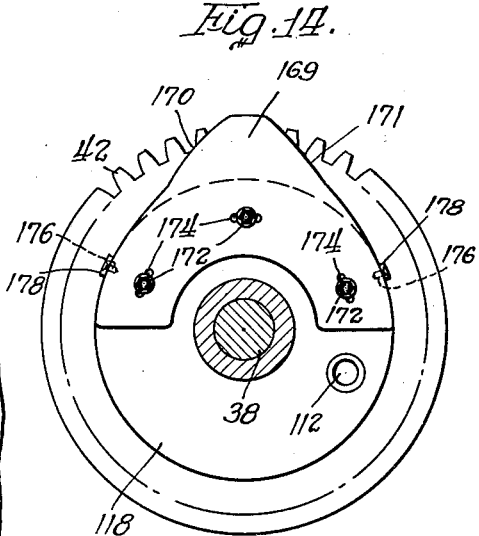
Inventor:
Carl J. Rundquist.
By Bair & Freeman
Attorneys Inventor:
Carl J. Rundquist
By Bair & Freeman
Attorneys

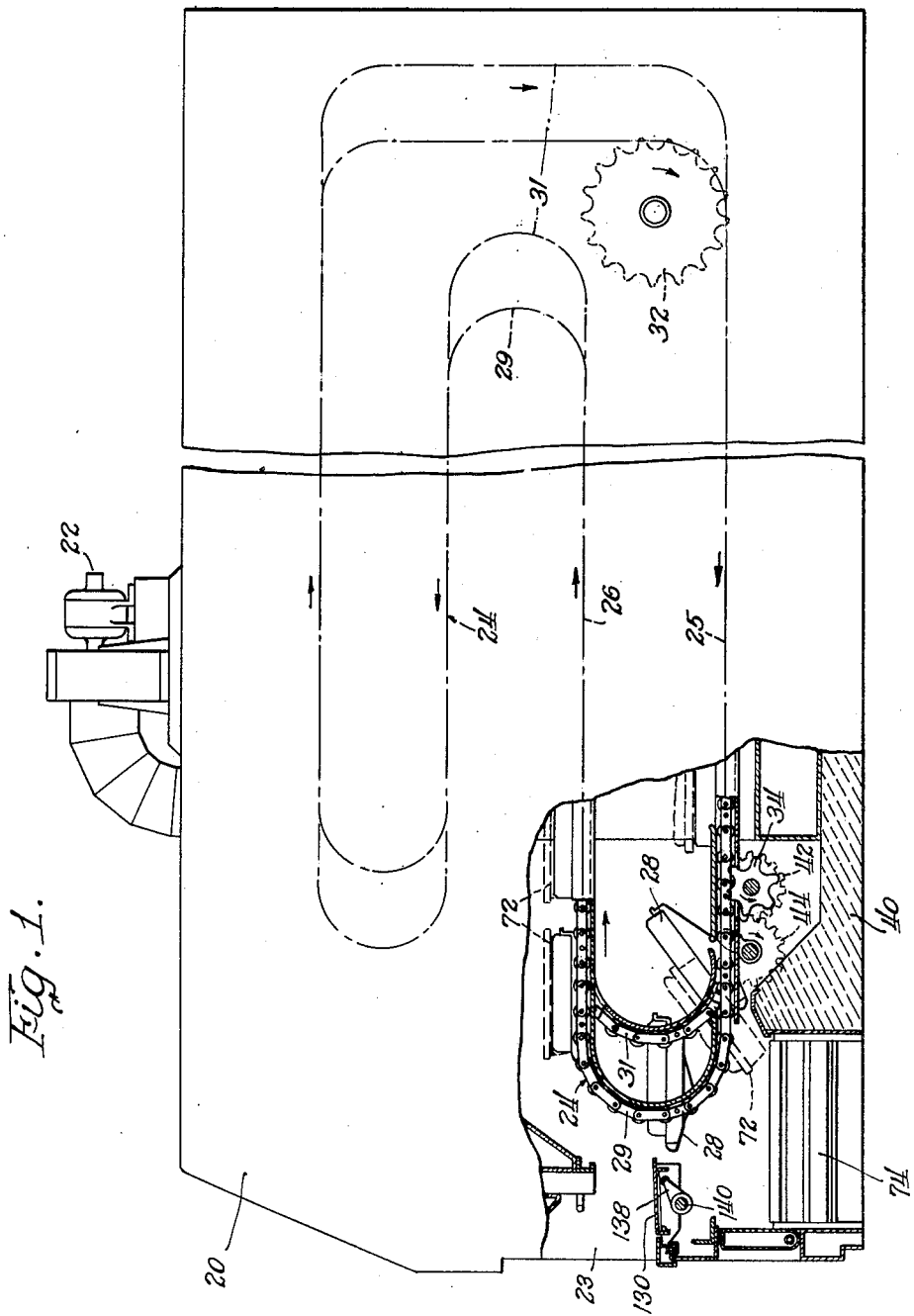

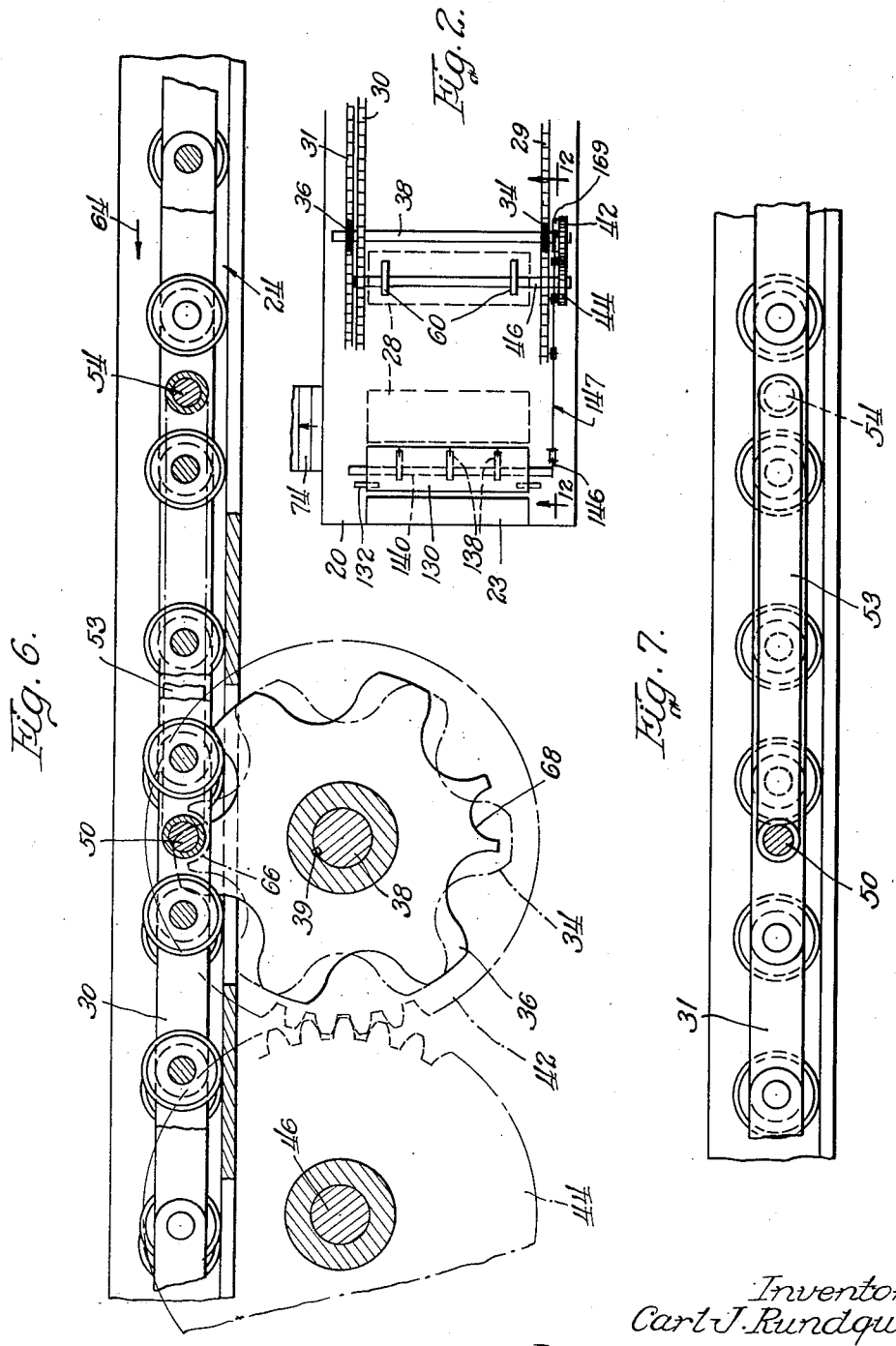

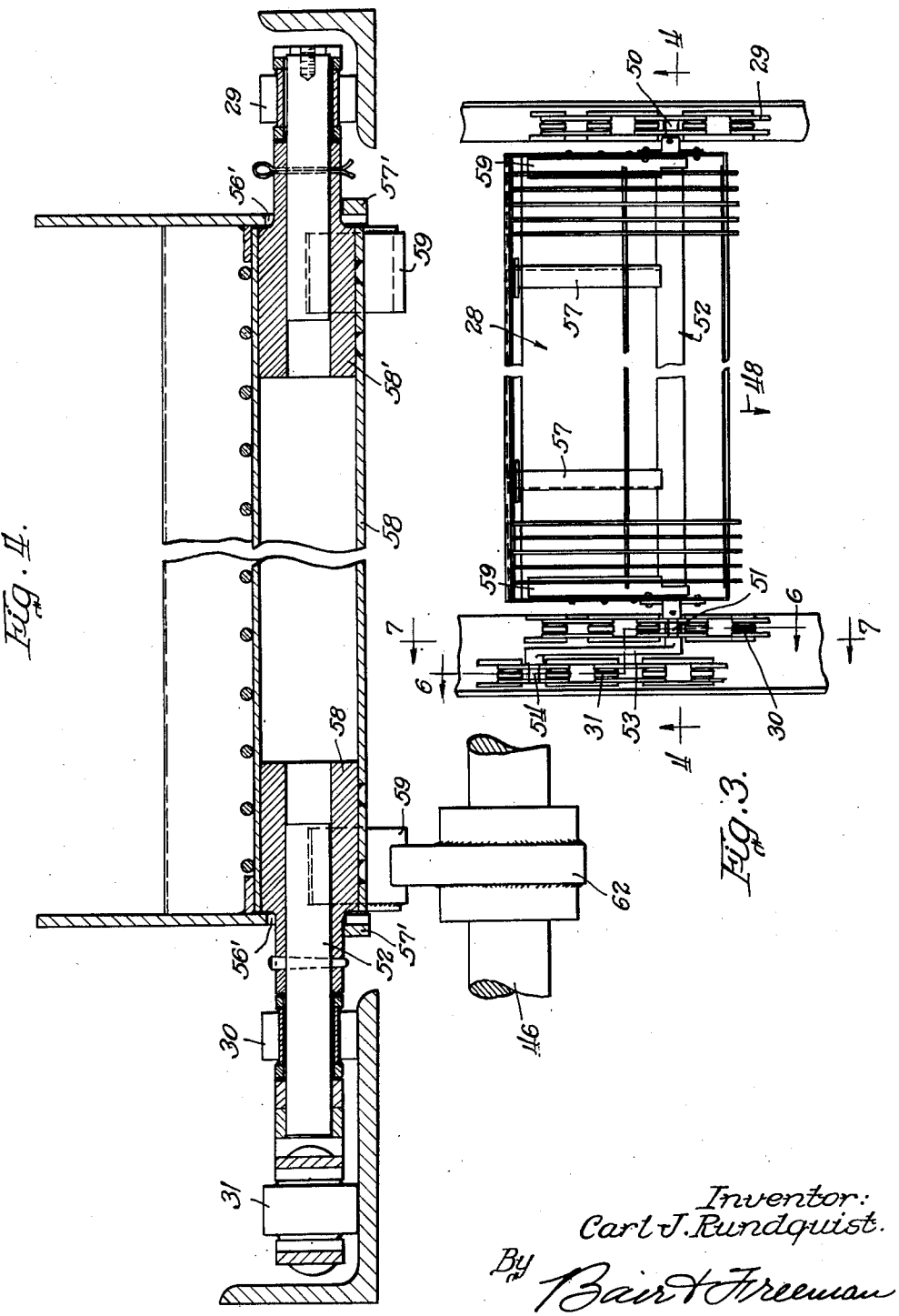

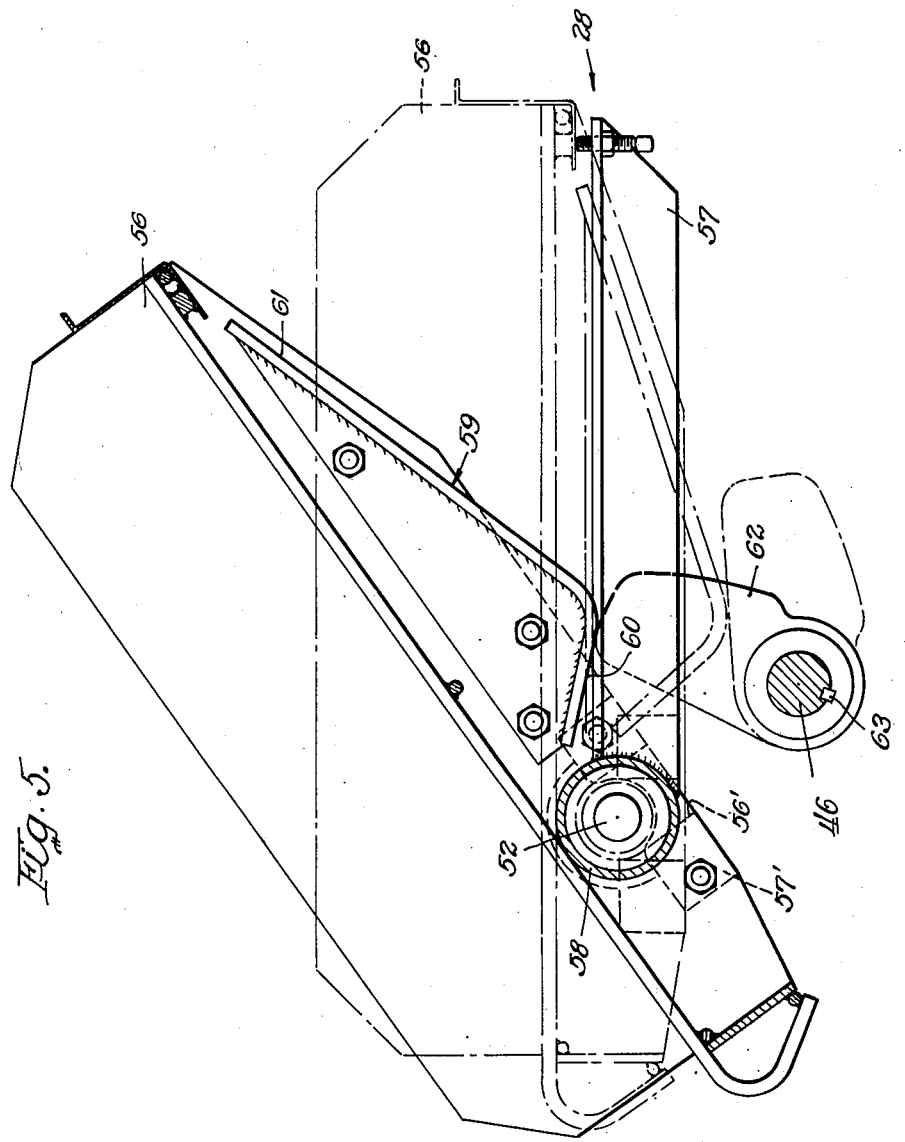

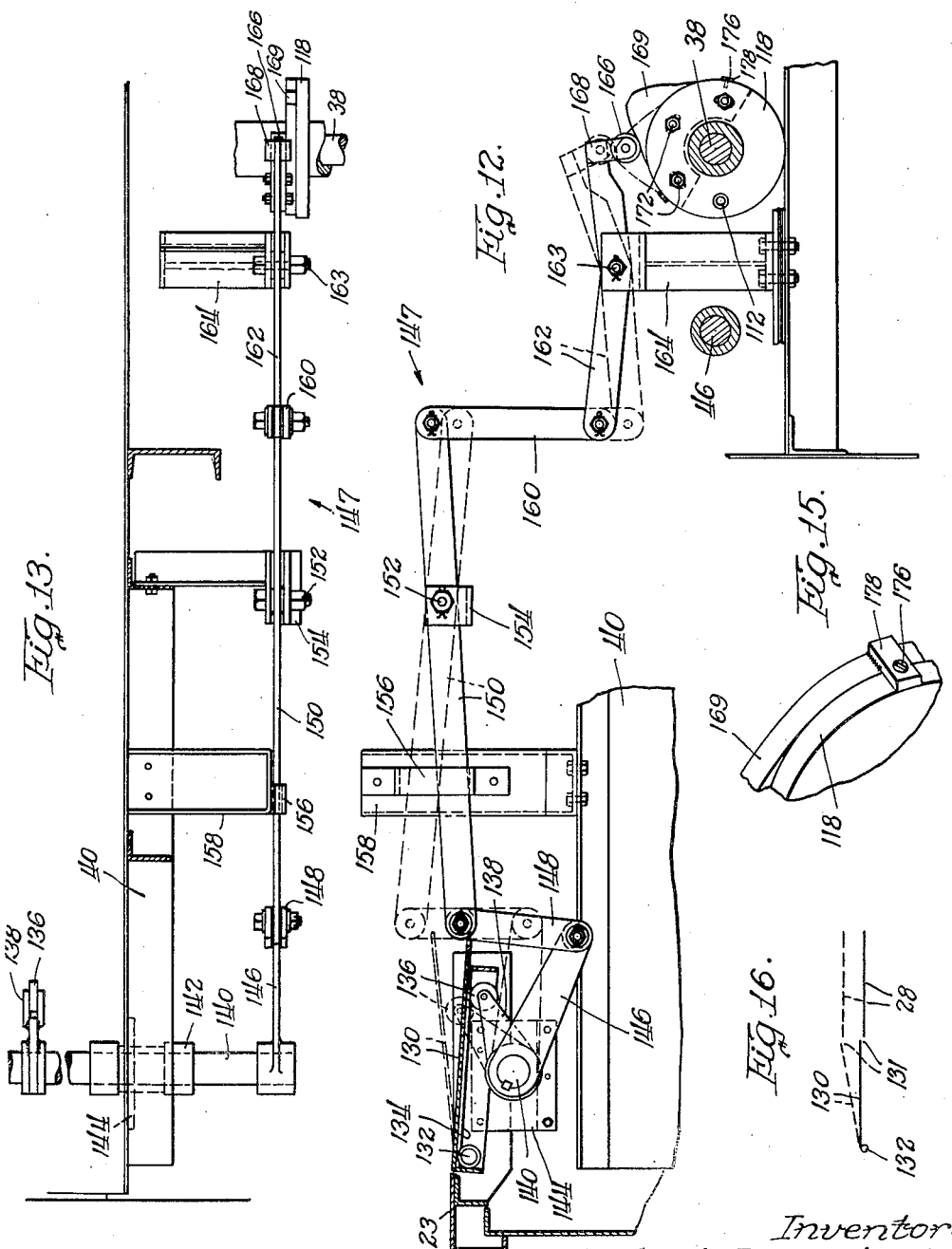

Patented Feb. 13, 1951

2,541,386

UNITED STATES PATENT OFFICE 2,541,386

LOADING AND UNLOADING MECHANISM FOR BAKING OVEN CONVEYERS

Carl J. Rundquist, Chicago, Ill., assignor to The Petersen Oven Company, Chicago, Ill., a corporation of Illinois Application December 17, 1945, Serial No. 635,457

13 Claims. (Cl. 198—20)

This invention relates to commercial baking ovens, and particularly to baking ovens of the type having a conveyor provided with a plurality of spaced-apart tiltable trays.

This invention is especially adaptable to ovens in which the loading and dumping operations take place at the same end of the oven. In ovens of this type the articles to be baked obviously must be carried in both directions of travel, that is, on all runs of the conveyor, for removal therefrom adjacent the loading entrance. The conveyor trays carrying the articles to be baked must be level at all times, on all runs of the conveyor, and during their travel around turns from one to another.

There are a number of advantages of this type of oven, one being compactness for saving of space and materials of construction, and another being greater efficiency for there is no idle run of the conveyor. For example, if the articles were inserted at one end and dumped at the other, one run of the conveyor would of necessity return to the loading end empty. This would make the oven twice as long as it is in the present construction.

An obstacle encountered in prior ovens of this general type was the lack of effective means for dumping the trays near the point of loading and immediately render them available for loading, and a means for facilitating loading of the trays.

I have devised a synchronized mechanism which includes a means for causing tilting of the trays on one run of the conveyor, just before they reach the loading entrance of the oven, and a movable loading platform adjacent the loading entrance of the oven which registers with the trays successively for a short distance while the trays pass the loading entrance. The articles to be baked are placed on the movable loading platform and pushed onto a registered tray. The trays can thus be loaded while the conveyor is operating continuously.

The tilting means and the movable platform are arranged so that their operation coincides with the passing of a tray adjacent to them, and the two are synchronized to operate together, being driven by a single driving element, preferably, though not necessarily, by the conveyor chains.

The tray tilting means is designed so that the trays can be tilted to different angles to control the speed at which loads of different weights and/or sizes may slide off of the trays.

The movable loading platform registers with the trays during an interval of travel thereof, and disposed a short distance above them so as to permit convenient and expeditious movement of the food containers onto the trays from the platform. The movable platform is particularly adaptable to, though it is not limited to, use in connection with a continuously traveling conveyor.

The movable loading platform eliminates the necessity of stopping the conveyor to place each tray in registration with a platform for loading, with attendant overloading of the conveyor drive motor in starting the conveyor after each tray is loaded as is necessary in certain ovens heretofore made. Another difficulty of prior ovens having an intermittently operated conveyor is that even when the conveyor is stopped, the tray to be loaded is not always in registration with the loading shelf. If the tray stops above the loading shelf, it is difficult to slide the food containers onto the tray and may necessitate individual handling of the pans of food stuff; and, if the tray stops below the shelf, there is an objectionable drop from the shelf to the tray, which may impair the quality, shape and appearance of the baked food stuff. The movable platform of my invention can also be used as well with intermittent drive, i. e., stopping the conveyor to place each tray in position for loading, if desired.

Another advantageous feature is that the movable loading platform is adaptable to either hand or automatic loading.

Still another feature of the invention is that regardless of the speed of the conveyor, the motion of the movable loading platform is perfectly timed with the movement of the conveyor, and preferably, though not necessarily, the platform is driven by the conveyor.

Another advantage of the invention resides in the fact that there are no special motors or conveyor drives required for actuating the dumping mechanism and the movable loading platform.

With these and other objects in view, my invention consists in the construction, arrangement and combination of the various parts of my device whereby the objects contemplated are attained, as hereinafter more fully set forth, pointed out in the claims, and illustrated in the accompanying drawings, wherein:

Figure 1 is a view of the oven as a whole, partly in diagram and partly in section, and embodying my invention.

Figure 2 is a diagrammatic view in plan showing the relative positions of the principal operating devices and mechanisms.

Figure 3 is a plan view of a tray, and fragmentary portion of the conveyor chains.

Figure 4 is an enlarged section taken on line 4—4 of Figure 3.

Figure 5 is a view showing in full lines a tray with its grille in position of extreme tilt, and its normal position being shown in dot-and-dash lines.

Figure 6 is an enlarged sectional view taken on line 6—6 of Figure 3.

Figure 7 is an enlarged sectional view taken on line 7—7 of Figure 3.

Figure 8 is an end view of the drive mechanism and showing the oscillating cam for operating the movable loading platform in relative position therewith.

Figure 9 is a plan view of the drive mechanism and adjusting means for adjusting the height of the dumping cam.

Figure 12 is a layout figure of the movable platform and its operating linkage, parts in section, and showing the platform and linkage as viewed from approximately line 12—12 of Figure 2.

Figure 13 is a plan view of the linkage shown in Figure 12.

Figure 14 is a view taken on line 14—14 of Figure 9 and shows the oscillating cam for operating the linkage of Figures 12 and 13 which actuates the movable loading platform.

Figure 15 is a perspective view of a small portion of the oscillating cam shown in Figure 14 and the means for securing it in locked position.

Figure 16 is a diagrammatic view showing the relation between the movable loading platform and a tray in different positions.

Figure 10:
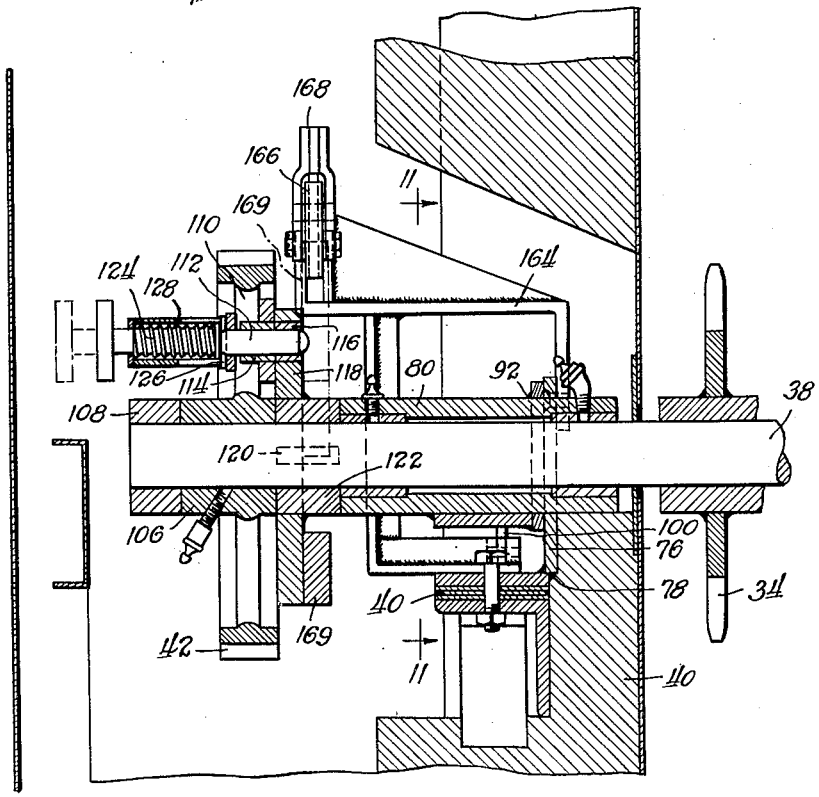
Figure 10 is an enlarged sectional view taken on line 10—10 of Figure 9.

Referring now in detail to the drawings, Figure 1 shows a baking oven 20 of the type to which my invention is applied. This oven is of the continuously-operating type, having a continuously travelling conveyor upon which the pans of foodstuff to be baked are placed. The oven is equipped with a blower unit shown at 22 for clearing the steam from the region at the front of the oven. The oven is broken away in the lower left-hand corner which is also at the front end of the oven, and shows a loading opening 23. A conveyor 24, a part of which is shown in dot-and-dash lines, extends horizontally in the baking chamber of the oven and doubles back for an additional run through the upper part of the chamber of the oven toward the front end thereof, and back and then down to the lower part of the oven completing its cycle. In the portion which is broken away, the relation of the conveyor to the loading entrance 23 is clearly shown. For the purposes of the present invention, the lowermost run 25 of the conveyor will be regarded as travelling to the left, or toward the loading entrance 23 of the oven, and the upper run 26 travelling away from the loading entrance. Trays 28 are secured to the conveyor 24 and pivoted thereon as will be explained later in connection with the dumping mechanism, and are spaced at regular intervals along the conveyor for proper operation in timed relation to the actuation of the dumping mechanism and movable loading platform. In order for the trays 28 to carry food effectively, they must be maintained level, and for this purpose the conveyor is made up of main chains 29 and 30 for supporting and carrying the trays 28, and an auxiliary chain 31 for stabilizing the trays and maintaining them level in the travel of the conveyor. The conveyor can be driven by a conventional continuous drive operating through gear 32. For a full description of this general type of conveyor, reference may be had to Patent No. 2,242,813, issued May 20, 1941, to John V. Cook.

Referring to Figure 2, which is a diagrammatic view in plan of a portion of the oven, the relative positions of the principal operating parts of my invention may be observed. The source of power for the synchronized dumping mechanism and movable loading platform resides in two sprockets 34 and 36 secured to a shaft 38 for rotation therewith by keys 39. The shaft 38 is rotatably mounted in the oven frame 40. The sprockets and shaft are driven by the conveyor 24. The sprocket 34 is driven by the main chain 29 on one side of the oven, and the sprocket 36 is driven by the auxiliary chain 31 on the opposite side of the oven. On the outer end of the shaft 38 on the side of the oven next to the main chain 29 and mounted for clutching engagement with the shaft 38, is a gear 42 which meshes with another gear 44 fixedly secured on a shaft 46. Shaft 38 is mounted for rotation in the oven frame 40 by suitable bearings, and shaft 46 is mounted for adjustment on the frame 40 by a special device, the features of which will be hereinafter described.

As shown in Figure 3, the tray 28 travels in the direction indicated by the arrow 48 on the lower run 25 of the conveyor 24. The tray is supported by trunnions 50 and 51 disposed near the leading edge of the tray, and connected to and supported by the main chains 29 and 30, respectively. Trunnions 50 and 51 are formed on the extremities of a transverse shaft 52, about which the grille of the tray 28 is adapted to tilt. Between the auxiliary chain 31 and the main chain 30 next to it, is disposed a stabilizing arm 53 for each tray, each of which is fixedly secured to the trunnion 51 of an aligned tray. On the outer end of the stabilizing arm 53 is another trunnion 54 extending in the opposite direction from trunnion 51, and pivotally mounted in the auxiliary chain 31.

Referring to Figures 3 and 5, the tray 28 is made up of a grille 56 and supports 57 therefor. The tray supports 57 are rigidly supported by the transverse shaft 52, for example, by welding them to sleeve 58 which, with stub shafts 58', make up transverse shaft 52. The stabilizing arm 53 being also rigid with the shaft 52, the tray supports 57 are maintained in substantially a horizontal position because of the fact that the two ends of the stabilizing arm 53 are maintained horizontal by the constant relative positions of main chain 30 and auxiliary chain 31.

The tray grille 56 is supported at two points by the transverse shaft 52 by slots 56' formed in the side panels of the grille and which fit over the shaft 52 beyond the ends of the sleeve 58. The grille is held in place thereon by yoke member 57' fitted on the underside of the transverse shaft 52 and closing the open ends of the slots 56'. The grille is therefore supported at four points, two on the transverse shaft 52 and two at the rear end of the tray on the supports 57.

The normal position of the tray grille 56 is shown in dot-and-dash outline, and when it is in this position, the trailing edge rests upon the supports 57. Secured to the underside of the tray grille 56 are cam shoes 59, each having a forward inclined surface 60 and a rearward inclined surface 61. One such cam shoe 59 is located at each end of the tray grille 56 for engagement with dumping cams 62 mounted on the shaft 46. The dumping cams 62 are secured to the shaft 46 by keys 63, or other similar means.

Referring to Figures 6 and 7, the conveyor 24 in travelling in the direction of the arrow 64, engages the two sprocket wheels 34 and 36. The sprocket wheels 34 and 36 each have one tooth partially cut away, as indicated at 66 and 68, respectively, to prevent interference of the sprocket 34 with the trunnion 50 of the tray 28 supported in the main chain 29, and the sprocket 36 from interfering with the trunnion 54 on the stabilizing arm 53 which is secured in the auxiliary chain 31. It will be noted that these two sprockets 34 and 36 are angularly positioned relatively to each other as may be seen in Figure 6, so that the cutout portions 66 and 68 are not in register, and because they are not in register, there is no likelihood of either of the chains 29 and 31 skipping over the teeth on their sprocket because at least one of the sprockets 34 and 36 will be positively engaged by its respective chain at all times, thus insuring continuous driving of shaft 38 incident to movement of the conveyor.

The sprocket 34 is shown in dot-dash lines in Figure 6, since it would not actually be seen in this view, because it is located on the opposite side of the oven; but it is superimposed on this figure to show its relative angular position with the sprocket 36.

When the trunnion 50 is in engagement with the cutout portion 66 of sprocket 36, the trunnion 54 is disposed rearward of this point, and accordingly the cutout portion 68 is angularly disposed so as to engage the trunnion 54 when the auxiliary chain has moved forwardly an amount corresponding to the distance between trunnions 50 and 54. It will also be seen that the full teeth of the sprockets 34 and 36 are not in register, because the distance between the trunnion 50 and the trunnion 54 is not a whole multiple of the distance between the rollers on the chain. By thus having the sprocket 34 engaged by the main chain 29 and the sprocket 36 engaged by the auxiliary chain 31, there is positive drive through these sprockets to the shaft 38 at all times.

The conveyor 24 travelling in the direction of the arrow 64 (see Fig. 6) rotates the sprockets 34 and 36 and shaft 38 in counterclockwise direction, as seen in Figure 8, and the gear 42 being secured to the shaft 38, also rotates counterclockwise. The gear 44 (see Figures 6 and 8) is in constant mesh with the gear 42 and is rotated clockwise thereby. The gear 44 being secured to the shaft 46, rotates the shaft and dumping cams 62 clockwise also. When the tray 28 is travelling forward, the dumping cams 62 are rotating clockwise (see Figure 5), and when the tray reaches a predetermined position, the dumping cams 62 engage the leading surfaces 60 of the cam shoes 59, thereby causing tilting of the tray grille 56 to the position shown in full lines in Figure 5. The dumping mechanism, including the dumping cams 62, is positioned at such a point near the forward end of the oven that the tray grille 56 is fully tilted to permit the load 72, in the form of pans of food stuff, as indicated in Figure 1, to slide off the tray onto a cross conveyor 74, which carries the baked products out of the side of the oven. The cross conveyor 74 may be of any desired construction and does not form a part of this invention, which conveyor 74, it may be understood, is intermittently operated, its operation being arrested during the dumping of the trays 28. After the tray 28 is tilted and the load slides off, continued travelling of the conveyor and movement of the dumping cams 62 causes the cams 62 to engage trailing cam surfaces 61 of the cam shoes and thus causing the grille 56 to return to its normal position under its own weight. The tray grille being pivoted near its leading edge, the preponderance of weight rearward of the leading edge causes it to descend by gravity under control of cam shoe 59 and dumping cams 62.

It is desirable to be able to adjust the degree of tilt for the tray grilles 56, to provide for a uniform rate at which the food containers will slide off the tray onto the cross conveyor 74, since loads of different weights and/or sizes will slide off at different rates of speed. To accomplish this, I have devised a novel method of adjusting the height of the dumping cams 62 so that they will engage the trays 28 to different extents.

Figure 11:
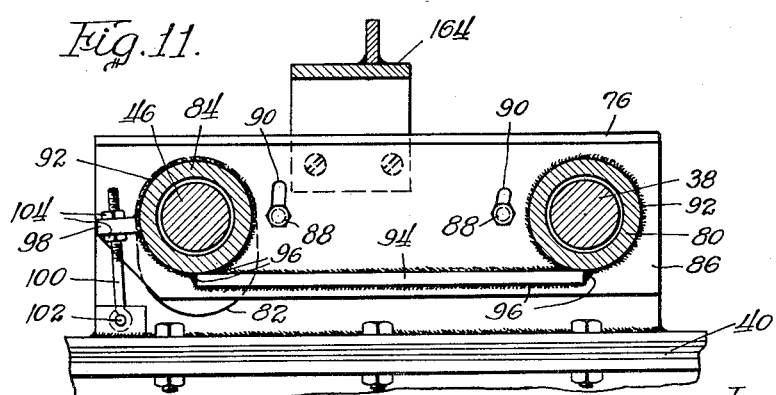
Figure 11 is a view taken on line 11—11 of Figure 10.

Attention is directed to Figures 8, 9, 10 and 11 for this novel mechanism for adjusting the dumping cams 62. A vertically disposed plate 76 is secured to the oven frame 40 as by welding as indicated at 78 (see Figure 10), and is provided with an opening at one end for receiving shaft 38 and its bearing housing 80, and at the other end with a slot 82 for receiving shaft 46 and its bearing housing 84. The slot 82 is curved about an arc whose center of curvature is the axis of the shaft 38. Mounted on the forward side of the plate 76 (as viewed in Figures 9 and 11) is another vertically disposed plate 86 held in contact with the plate 76 by means of bolts 88 secured to the plate 76. Bolts 88 fit in slots 90 formed in the plate 86, and these slots also are curved about arcs having their center of curvature at the axis of shaft 38. Openings are formed in either end of the plate 86 for receiving shaft 38 and its bearing housing 80, and shaft 36 and its bearing housing 84. The housings 80 and 84 are welded to the plate 86 as indicated at 92. An additional plate 94 horizontally disposed and positioned perpendicular to the plate 86 is welded thereto and to the housings 80 and 84 as indicated at 96. A lug 98 is welded to the housing 84 at the side thereof farthest from shaft 38, and is provided with an opening for the reception of an eye bolt 100 secured at 102 on the oven frame. The end of the eye bolt 100 is threaded and provided with nuts 104 above and below the lug 98. The left end of the plate 86 as viewed in Figure 11 can be raised or lowered, rotating about shaft 38 as a pivot. This is accomplished by adjusting the nuts 104 on the eye bolt 100. When the plate 86 is raised or lowered, it carries the shaft 46 with it. The curvature of slot 82 permits the housing 84 to ride therein and the curvature of the slots 90 accommodate the relative movement of the bolts 88 in the rotating movement of the plate 86.

When it is desired to decrease the extent to which the tray grilles 56 will be tilted, the left end of the plate 86 is lowered carrying with it the housing 84 and shaft 46. The dumping cams 62 being mounted on the shaft 46 are lowered also, and, accordingly, do not have such a great camming effect on the cam shoes of the tray grilles 56, tilting the trays a lesser amount than when the plate 86 is in its uppermost position, or as shown in the drawings. Similar adjusting means is provided at the opposite side of the oven for supporting the other ends of the shafts 38 and 46. The adjusting device is precisely the same as the one just described, except that it is opposite and symmetrical, and a description of the present will suffice for both.

In order to disconnect the dumping mechanism, I provide clutch means for declutching the gear 42 from the shaft 38, and thereby disengage the drive to gear 44. The hub 106 of the gear 42 is mounted on the shaft 38 for rotation with respect therewith and is secured on the shaft by a collar 108. Mounted in the web 110 of the gear 42 is a spring-pressed plunger 112 sliding in a sleeve 114 in the gear 42 and a sleeve 116 which is disposed near the outer periphery of a clutch disc 118. Clutch disc 118 is welded to a hub 122 which, in turn, is secured to the shaft 38 for rotation therewith by a key 120. When it is desired to disconnect the gear 42, the plunger 112 is withdrawn from the sleeve 116 in the clutch disc 118 against the action of the spring 124 and it may be locked in that position by a pin 126 which passes through the plunger 112, which fits in slot 128.

In connection with the dumping mechanism as described, I have provided a movable loading platform which is operated in timed relation to the conveyor 24, and is synchronized in operation with the dumping mechanism. In dumping the load so near the loading entrance, it is necessary that the trays be righted immediately to be put in position for reloading, which is accomplished by the arrangement shown. As the tray passes the loading entrance of the oven, a loading platform 130 is disposed in said entrance and moves vertically with the trays for a short distance. The food containers 72 which are placed on the movable platform can easily be pushed onto the registering trays during the time interval that the movable platform moves with the trays. The platform then lowers to be in position for cooperative movement with the next successive tray.

The movable platform 130 (see Figures 1, 12 and 13) is pivoted on trunnions 132, positioned at either end of the platform and mounted in the oven frame 40. On the under surface of the movable platform are provided wear strips 134 on which rollers 136 are adapted to have contact. The rollers 136 are mounted on the swinging ends of arms 138 which are fixedly secured to a horizontally extending rock shaft 140, mounted in housings 142 at either end of the shaft 140. The housings 140 are supported by plates 144 secured to the oven frame 40. An arm 146 is fixedly secured to one end of the shaft 140 for rocking it. I provide a multiple linkage for oscillating the movable platform 130. This linkage is indicated in its entirety by the numeral 147, and includes a toggle link 148, pivotally secured to the swinging end of the arm 146. The other end of the toggle link 148 is pivotally secured to a lever 150 which is pivoted at 152 on a bracket 154, fixedly mounted on the oven frame 40. The left-hand arm of the lever 150, or that nearest the toggle link 148, extends through a yoke 156 for sliding and guided movement therein, the yoke 156 being secured to a bracket 158 which is also mounted on the oven frame. On the opposite end of the lever 150 a second toggle link 160 is pivoted, and this toggle link 160 is also pivoted to a second lever 162 which is pivoted at 163 on bracket 164 fixedly mounted on the oven frame. On the end of the lever 162 opposite toggle link 160, is a roller 166 mounted in a bracket 168 secured to the lever 162. The roller 166 is adapted for engagement by an oscillating cam 169. While the cam 169 itself does not oscillate, it is referred to as an oscillating cam because its function is to produce an oscillating motion to the movable platform 130.

The oscillating cam 169 is secured to the clutch disc 118 by bolts 172 extending through slots 174 in the cam 169, and threaded into the clutch disc 118. Lock screws 176 (see Figures 14 and 15), extend through openings in the lugs 178 welded to the cam 169, and threaded into the clutch disc 118. The cam 169 has limited adjustment on the clutch disc 118. Initially the lock screws are not in place as shown. The cam 169 is adjusted as need be on the bolts 172 for proper timing. The bolts 172 are then tightened, the mechanism is operated to test the timing, and when the proper timing is found, holes are tapped and threaded in the clutch disc 118, and lock screws 176 are tightened in place to secure the cam 169, fixedly to the clutch disc 118.

The cam 169 is therefore secured for positive rotation with the clutch disc 118. As the clutch disc 118 and the oscillating cam 169 are rotated, the roller 166 is engaged by the cam 169, for operating the linkage described in Figures 12 and 13 for oscillating the movable platform 130. As viewed in Figure 12, the clutch disc 118 and the oscillating cam 169 rotate counterclockwise. The cam in the position shown in this figure is in engagement with the roller 166 and is about to operate the linkage. As the cam 169 rotates to the left, the roller 166 and the right-hand end of the lever 162 are raised to the position shown in dotted lines, drawing downwardly the toggle link 160 and the right-hand end of the lever 150. As the left-hand end of the lever 150 is thereby raised, it draws upwardly the toggle link 148 and rocks the arm 146 and shaft 140 counterclockwise, which rocks the arms 138 in a counterclockwise direction also, causing their rollers 136 to move over the wear strips 134, and thereby moving the movable platform 130 to the position shown in dotted lines. On continued rotation of the cam 169, the roller 166 riding over the hump and down the opposite side of the cam, permits the linkage to return to the full line position under the weight of the movable platform 130, which returns to the full line position shown. The lower limit of the movable platform 130 is determined by the yoke 156 which serves as a stop for the left-end of the lever 150 for arresting the linkage in the position shown in full lines and thereby preventing the movable platform 130 from lowering any farther. Rotation of the oscillating cam 169 thus imparts an oscillating motion to the movable loading platform 130, and its range is that shown in the full and dot-and-dash line positions in Figure 12.

Referring now to Figure 16, the relative position of the movable platform 130 and trays 28 are shown. As the leading edge of each tray 28 approaches the free edge 131 of the movable loading platform, the latter is resting in its lowermost position. The oscillating cam 169 is so timed with respect to the conveyor 24, being driven by the chains thereof, that just before the tray reaches the level of the movable loading platform 130, the cam 169 commences to raise the platform, which continues to be raised and lead the tray until the upper limit of movement of the platform is reached. The free edge 131 of the movable platform 130 is adjacent to the leading edge of each tray 28 successively, as it moves upwardly past the loading entrance 23 of the oven, and when the successive trays register therewith, said free edge is normally positioned slightly above the grille supporting surface of the tray and maintains such relation to the trays, throughout the raising movement of the platform. The purpose of this displacement is to permit food containers on the movable platform 130 to be easily pushed onto the tray 28. In practice this displacement is approximately one-quarter inch but this of course may vary to suit different conditions. The period of travel from the full line positions to the dotted line positions is sufficient time in which to push all of the food containers from the movable platform 130 onto the tray 28. Past this point, the tray continues upwardly as the conveyor continues to travel, and the movable platform returns to its lower position and remains temporarily at such position until the oscillating cam 169 makes another revolution and operates the linkage.

This loading platform is adapted for either automatic loading or hand loading. It can also be used for intermittent conveyor travel as well as for continuous travel, for whatever point a tray may stop in approximate alignment with loading entrance where it can be loaded, the movable platform will always be positioned a slight distance above it and in registration therewith. The device can therefore be applied to nearly all ovens, eliminating the necessity for special drives and timing apparatus.

It is to be noted that by virtue of the construction described, the linkage and the movable platform 130 are actuated in correlation to the conveyor 24, so that as the conveyor travels and each successive tray aligns with the loading entrance, the platform is then moved in registered relation to the tray as above described.

When a pivoted arm rotates (consider the movable platform 130 a pivoted arm for the moment), its rate of vertical movement varies constantly. If the movable platform 130 were to rotate, that is, be raised, in a uniform circular motion, the displacement between the free edge 131 of the movable platform 130 and the trays 28 would not be the same in the lower position as in a higher position. The particular shape of cam 169 overcomes this condition.

Referring to Figure 14, it will be seen that the curvature of the camming surfaces 170 and 171 of the oscillating cam 169 is not uniform. The lower portion of the cam is relatively wide, tapering abruptly at a point farther out, and then assuming a new curvature. The exact form of this curvature of the surfaces 170 and 171 need not be described in detail, but suffice it to say that due to its peculiar shape, the linkage is operated at a rate so that the free edge 131 of the movable platform 130 is caused to remain in proper correlation to the tray throughout the range of vertical movement of said free edge of the platform.

There is positive synchronization between the dumping mechanism and loading mechanism. There is only one position in which the clutch disc 118 can be locked in position with the gear 42. When the clutch disc 118 is in clutched relation with the gear 42, the oscillating cam 169 will always be in the same position relative to the dumping cam 62, thereby tilting the trays 28 and oscillating the movable platform 130 in proper timed relation to the travel of the conveyor.

Although I have herein shown and described a preferred embodiment of my invention, manifestly it is susceptible of modifications and rearrangement of parts without departing from the spirit and scope thereof. I do not, therefore, wish to be understood as limiting this invention to the precise form herein disclosed, except as I may be so limited by the appended claims.

I claim is my invention:

1. A synchronized dumping and loading mechanism for a baking oven comprising a conveyor having a portion adapted to travel upwardly adjacent the loading entrance of the oven, and means for driving the conveyor, the conveyor having drive chains and a series of trays spaced along the conveyor and adapted to be tilted about pivot means secured to the chains, comprising, in combination, tilting means for tilting the trays at a given point along their path of travel, a movable loading platform mounted adjacent the loading entrance and having one edge disposed adjacent the path of movement of the trays, oscillating means for moving the movable loading platform through a limited range and causing said one edge to be moved in the direction of movement of the trays and at substantially the same level of each tray successively, means for driving the tilting means and the oscillating means in synchronism, and means operated by the conveyor chains for driving the synchronizing means.

2. A synchronized dumping and loading mechanism for a baking oven comprising a conveyor having a portion adapted to travel upwardly adjacent the loading entrance of the oven, and means for driving the conveyor, the conveyor having drive chains and a series of trays spaced along the conveyor and adapted to be tilted about pivot means secured to the chains, comprising in combination, tilting means for tilting the trays at a given point along their path of travel, a movable loading platform pivoted adjacent the loading entrance and having its free end disposed adjacent the path of travel of the trays as they pass the loading entrance of the oven, oscillating means for oscillating the movable platform through a limited range, the free end of the movable platform being substantially at the level of a tray during the travel of said free end of the movable platform through its range in one direction, means for driving the tilting means and the oscillating means in synchronism, and means operated by the conveyor chains for driving the synchronizing means.

3. A synchronized dumping and loading mechanism for a baking oven comprising a conveyor having a portion adapted to travel upwardly adjacent the loading entrance of the oven, and means for driving the conveyor, the conveyor having drive chains and a series of trays spaced along the conveyor and adapted to be tilted about pivot means secured to the chains, comprising in combination, tilting means for tilting the trays at a given point along their path of travel, said tilting means being adjustable for varying the degree of tilt of the trays, a movable platform pivoted adjacent the loading entrance and having its free end disposed adjacent the trays as they pass the entrance of the oven, oscillating means for oscillating the movable platform through a limited range, the free end of the movable platform being substantially at the level of a tray during the travel of said free end of the movable platform through its range in one direction, means for driving the tilting means and the oscillating means in synchronism, and means operated by the conveyor chains for driving the synchronizing means.

4. Dumping mechanism for a baking oven having a traveling conveyor, said conveyor having a horizontal run, a series of trays pivoted on the conveyor in spaced relation therealong, comprising, in combination, cam shoes on the trays, and movable dumping cams positioned below the horizontal run of the conveyor and adapted to be elevated and engage the cam shoes on each tray for successively tilting the trays, the movable dumping cams being elevated continuously during the entire tilting operation of the tray while the tray is in position for dumping, means operated by the conveyor for elevating the dumping cams, and clutching means for disconnecting said means from the conveyor, said clutching means being connectible with said conveyor so as to cause elevation of said dumping cams in timed synchronism with the spacing of said trays.

5. In a baking oven comprising a conveyor having a portion adapted to travel vertically adjacent the loading entrance of the oven, and means for driving the conveyor, the conveyor having a series of spaced trays, the combination of a platform pivoted for vertical swinging adjacent the loading entrance, an arm pivoted for vertical swinging below the platform, the pivoted arm having a roller on its free end for contacting the under side of the platform, linkage means for oscillating the pivoted arm and thereby the platform, and cam means driven in timed relation to the conveyor for operating the linkage.

6. Dumping mechanism for a baking oven comprising, in combination, a traveling conveyor, the conveyor having driving chains and a series of trays secured to the chains in spaced relation, the trays being pivoted for tilting movement, cam means secured on said trays, shaft and gear means actuated by said conveyor, second shaft and gear means meshing therewith and driven thereby, dumping cam means on said second shaft, said dumping cam means being adapted to successively engage the cam means on said trays for tilting the trays, said second shaft and gear means being adjustable in an arc around the axis of said first shaft and gear means.

7. Dumping mechanism for a baking oven having a traveling conveyor, said conveyor having a horizontal run, a series of trays pivoted on the conveyor in spaced relation therealong, comprising, in combination, cam shoes on the trays, shaft and gear means actuated by said conveyor, second shaft and gear means meshing therewith and driven thereby, both said shaft and gear means being positioned below said horizontal run, dumping cam means on said second shaft, said dumping cam means being adapted to successively engage the cam means on said trays for tilting the trays, said second shaft and gear means being adjustable vertically in an arc around the axis of said first shaft and gear means.

8. In a baking oven comprising a conveyor having a portion adapted to travel vertically in an arcuate path adjacent the loading entrance of the oven, and means for driving the conveyor, the conveyor having a series of spaced, tiltable trays, the combination comprising rotatable dumping cam means operable for tilting said trays at a predetermined point in the path of movement of the trays, a movable platform mounted adjacent the loading entrance and having one edge disposed adjacent the path of movement of the trays, rotatable cam means for oscillatably moving the movable platform through a limited range in the direction of movement of the trays and at substantially the same level of each tray successively, and means operated by said conveyor for rotating said cam means.

9. In a baking oven comprising a conveyor having a portion adapted to travel vertically in an arcuate path adjacent the loading entrance of the oven, and means for driving the conveyor, the conveyor having a series of spaced, tiltable trays, the combination comprising rotatable dumping cam means operable for tilting said trays at a predetermined point in the path of movement of the trays, a movable platform mounted adjacent the loading entrance and having one edge disposed adjacent the path of movement of the trays, rotatable cam means for oscillatably moving the movable platform through a limited range in the direction of movement of the trays and at substantially the same level of each tray successively, and means operated by said conveyor for rotating said cam means, the rotation of said cam means being in predetermined, fixed, timed relationship.

10. In a baking oven comprising a conveyor having a portion adapted to travel vertically in an arcuate path adjacent the loading entrance of the oven, and means for driving the conveyor, the conveyor having a series of spaced, tiltable trays, the combination comprising rotatable dumping cam means operable for tilting said trays at a predetermined point in the path of movement of the trays, a movable platform mounted adjacent the loading entrance and having one edge disposed adjacent the path of movement of the trays, rotatable cam means for oscillatably moving the movable platform through a limited range in the direction of movement of the trays and at substantially the same level of each tray successively, means operated by said conveyor for rotating said cam means, and clutch means for disconnecting said dumping cam means from operation by said conveyor, said clutch means being operable for connection of said dumping cam means for operation by said conveyor in single predetermined, fixed, timed relationship with said second cam means.

11. Dumping mechanism for a baking oven, comprising, in combination, a continuously traveling conveyor, the conveyor having driving chains and a series of trays secured to the chains in spaced relation, the trays being pivoted for tilting movement, cam means secured on said trays, rotatable cam means adapted to engage the cam means on the trays for tilting the trays successively at a given point in their line of travel, and driving means operated by said conveyor for rotating said rotatable cam means, said rotatable cam means being in engagement with the cam means on a tray during a portion of its cycle of rotation, said cam means being bodily movable toward and from the trays for varying the degree of tilt of the trays, said rotatable cam means, in all positions of bodily movement thereof, being in driven relationship to said driving means.

12. For use with an oven having a loading entrance, and a conveyor adapted to travel in an arcuate path past the loading entrance, the combination comprising a platform pivoted adjacent the loading entrance on a horizontal axis for vertical swinging, a pivoted arm for oscillatably swinging the platform, linkage for operating the pivoted arm, a rotatable element driven by the conveyor, cam means mounted on said rotatable element, said cam means being operative for operating said linkage and thereby raising the free edge of said platform in timed relationship with said trays successively, said cam means having a limited range of adjustment circumferentially of said rotatable element for producing registered relationship between said platform and trays in the upward swinging movement of the platform.

13. In a baking oven comprising a conveyor having a portion adapted to travel vertically in an arcuate path adjacent the loading entrance of the oven, and means for driving the conveyor, the conveyor having a series of spaced, tiltable trays, the combination comprising rotatable dumping cam means operable for tilting said trays at a predetermined point in the path of movement of the trays, driving means operated by said conveyor for rotating said cam means, said cam means being in engagement with a tray during a portion of its cycle of rotation, said cam means being bodily movable toward and from the trays for varying the degree of tilt of the trays, said rotatable cam means, in all positions of bodily movement thereof, being in driven relationship to said driving means, a movable platform mounted adjacent the loading entrance and having one edge disposed adjacent the path of movement of the trays, a rotatable element driven by the conveyor, second cam means mounted on said rotatable element, said second cam means being operative for oscillatably moving the movable platform through a limited range in the direction of movement of the trays and at substantially the same level of each tray successively, means operated by the conveyor for rotating said element, said second cam means having a limited range of adjustment circumferentially of said rotatable element for producing registered relationship between said platform and trays during raising movement of said platform.

CARL J. RUNDQUIST.

REFERENCES CITED

The following references are of record in the file of this patent:

UNITED STATES PATENTS

| Number | Name | Date |
|---|---|---|
| 1,048,834 | Hunt | Dec. 31, 1912 |
| 1,312,294 | Allison | Aug. 5, 1919 |
| 1,766,142 | Olson | June 24, 1930 |
| 2,002,009 | Hart et al. | May 21, 1935 |
| 2,342,393 | Feige | Feb. 22, 1944 |
| 2,397,726 | Cook | Apr. 2, 1946 |